United States Patent

Haeusler

[15] 3,650,134

[45] Mar. 21, 1972

[54] DEVICE FOR FORMING WORKPIECES BY LIQUID PRESSURE WAVES

[72] Inventor: Jochen Haeusler, Nurnberg-Laufamholz, Germany

[73] Assignee: Siemens Aktiengesellschaft, Munich, Germany

[22] Filed: Dec. 11, 1969

[21] Appl. No.: 884,618

[30] Foreign Application Priority Data

Dec. 19, 1968 Germany .......................P 18 15 540.3

[52] U.S. Cl. ............................................................72/56
[51] Int. Cl. ......................................................B21d 26/10
[58] Field of Search.......................................................72/56

[56] References Cited

UNITED STATES PATENTS 3,203,212  8/1965  Simicich ...................................72/56
3,267,710  8/1966  Inoue........................................72/56
3,456,291  7/1969  Balcar et al..............................72/56

Primary Examiner—Richard J. Herbst
Attorney—Curt M. Avery, Arthur E. Wilfond, Herbert L. Lerner and Daniel J. Tick

[57] ABSTRACT

A device for forming a workpiece by pressure waves generated in a liquid due to an undersurface spark discharge has a pair of electrodes mutually separated by the liquid and defining a spark gap therebetween. The electrodes are connected to a spark discharge circuit. One of the electrodes has a stationary part and a moveable part. An ignitor is connected to the moveable part and is thereby moveably insertable into the device so that the ignitor extends across the spark gap between the other of the electrodes and the one electrode. A means for holding a workpiece in a position surrounding the ignitor and the spark gap is also provided.

5 Claims, 3 Drawing Figures

DEVICE FOR FORMING WORKPIECES BY LIQUID PRESSURE WAVES

My invention relates to a device for processing workpieces with pressure waves formed as a result of an underwater spark discharge of a capacitor battery via a discharge circuit having a spark gap. The spark gap is defined by two electrodes between which a firing device is provided, the latter and the electrodes being surrounded by the workpiece.

During high-speed hydroelectric forming of metals, that is the forming of metals underwater by pressure waves which occur by means of a submerged spark discharge, a bank of capacitors is discharged by means of a discharge circuit and a spark gap in the water or other suitable liquid. The spark-over occurs between the electrodes located in the water after the capacitor battery, which is charged to high voltage, is switched in, provided that the electrical field intensity resulting from the electron gap and from the capacitor voltage is adequate for an impact ionization of the water or transmitting medium.

It is known that a free spark-over between the electrodes defining an underwater spark gap can be obtained with the usual capacitor charge voltages only up to an electrode spacing of a few centimeters. However, if a forming task requires an electrode spacing which is no longer bridgeable by a free spark-over, or if a slight distance between the electrodes and the workpiece cannot be avoided that would permit an undesired free spark-over upon the workpiece, then the firing of the underwater spark gap must be initiated by other means than the free spark-over. The best-known technique in such instances is to use thin wires which are clamped between the electrodes. Such wires serve as the firing device. However, the use of such firing wires creates difficulties which make an automation of the method very difficult. Automation would be very desirable, however, for the serial processing of workpieces by underwater pressure pulses. It is known that one component, namely the wire, has to be renewed with the wire explosion, that is, following each discharge. The necessary replacement of the wire produces undesirably large stroke periods. In this connection reference may be had to: G. Weimar, "Hochgeschwindigkeits-Umformung II" Werkstatt und Betrieb 96(1963),297–305; H. M. Müller, "Hydroelektrische Umformung, Das Umformverfahren mit Hilfe einer Stossstromanlage," and Mitt. Forschungsgesellschaft Blechverarbeitung (1965), 102–106; and G. C. Cadwell, "Spark Forming to Work," American Machinist-Metalworking Manufacturing (1961) 126–129.

It is known to use a firing device comprised of a nonconductive carrier wire having a conductive jacket. Because the nonconductive carrier is undisturbed after the discharge, the problem of the insertion of the firing device is reduced to the matter of a simple additional transport of the carrier up to a renewed bridging of the electrodes via the conductive jacket. This advantage can only be used in such forming problems where the discharge circuit and the workpiece are not linked.

Accordingly, it is an object of my invention to provide installing the firing device into equipment where a linking cannot be avoided.

According to a feature of our invention, an electrode comprises a stationary and a moveable portion, the latter functioning to introduce the firing device.

The invention affords the advantage that the installation of the firing device which is to be inserted into a moveable part of the electrode facilitates the insertion of the workpiece and of the firing device. This is true despite a connection with the discharge circuit that cannot be avoided without current return within the workpiece. Particularly, the transport of the moveable electrode part and also the transport of the firing device within the workpiece can be effected with the aid of the water which must of necessity be introduced into the workpiece, so that the most important moving process which also remains to be done according to the invented device, can be connected with a process which is necessary in any case, i.e., does not constitute an additional process.

Preferably, the moveable part of the electrode can be provided with a deflection device for the firing device. The most suitable firing device constitutes a wire, closed in itself, comprising a carrier which does not conduct electricity and which is wrapped with an electricity-conducting jacket.

Furthermore, it may be advantageous to provide outside the spark gap, a bath comprising an electrically conducting material for wrapping the nonconductive carrier, as well as a drying device. In this manner, the firing device can be continually provided with a new wrapping.

The invention will now be further discussed with reference being made to the accompanying drawings wherein.

Figure 1:
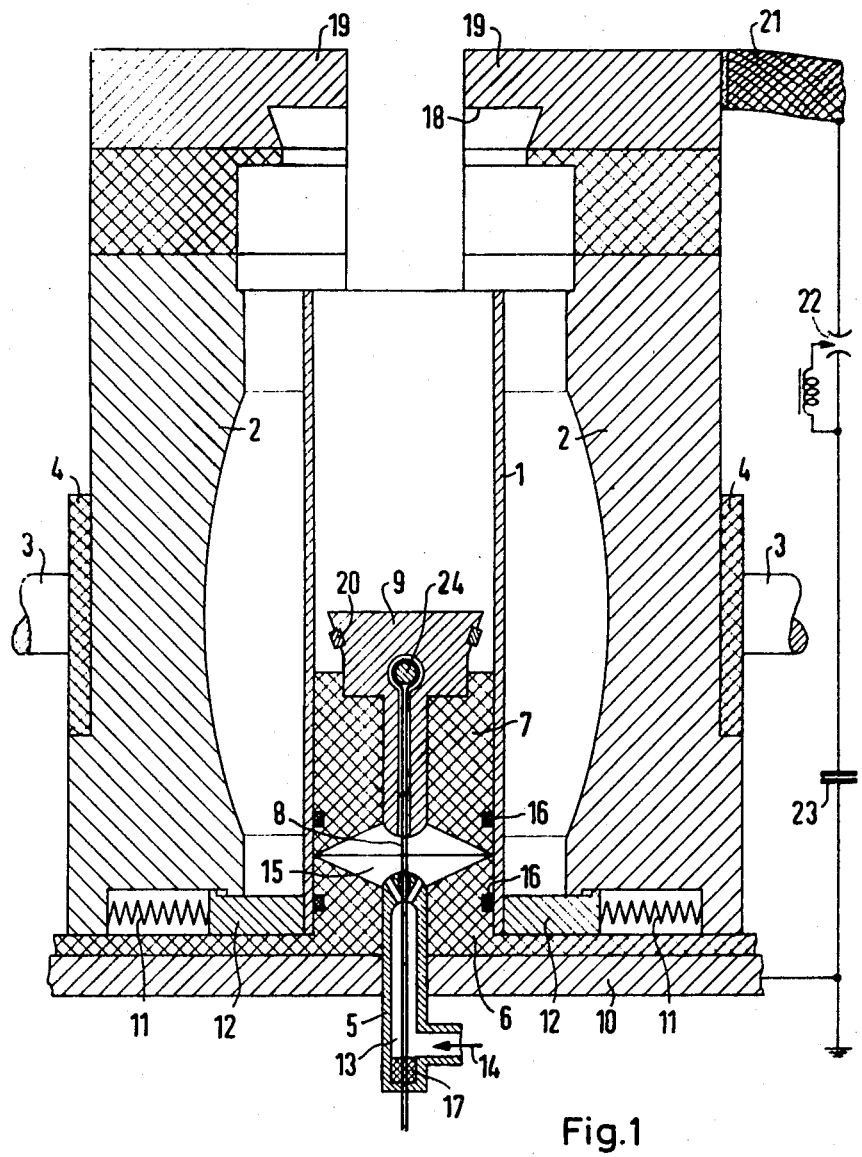
FIG. 1 is a longitudinal section of the apparatus according to the invention illustrating the firing device just before it is placed in position.
Figure 2:
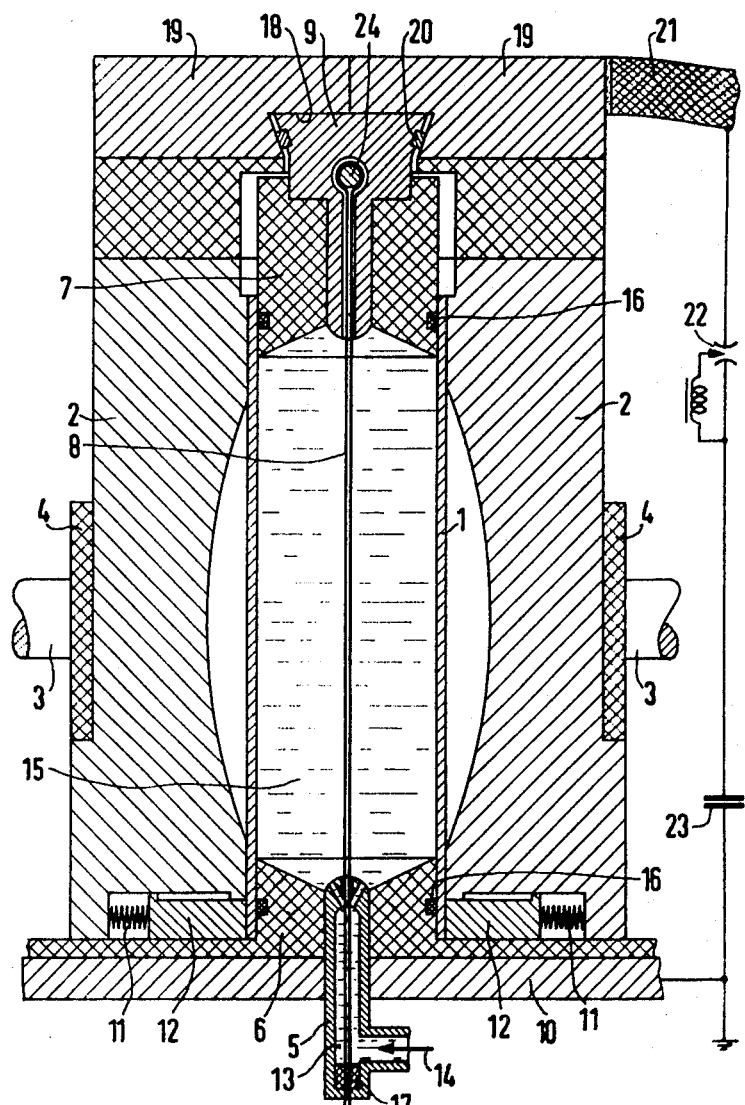
FIG. 2 is a longitudinal section of the apparatus of FIG. 1 showing the apparatus in operational readiness.

The same reference numerals are used for like parts in FIGS. 1 and 2. Referring to FIG. 1, reference numeral 1 designates an expandable cylindrical tube having an expansion determined by a two-part matrix 2. To remove the processed tube and to insert a new tube, the matrix portions 2 are moved via punches 3 which for example are hydraulically or pneumatically driven. The punches 3 are affixed to the matrix portions 2 via an insulated intermediate layer 4. When the opening between the matrix halves 2 is adequate, the tube 1 is moved across the insulating part 6 which encloses the lower electrode 5 and across the insulating part 7, the latter resting upon insulating part 6. The upper insulating component 7 contains the moveable electrode portion 9 which is rigidly installed therein and which transports the firing device 8. The lower electrode 5 is attached to the bottom plate 10. After the tube 1 is installed, the matrix halves are joined.

FIG. 1 shows how gripping jaws 12 are pressed against the tube 1 by springs 11. This arrangement provides adequate support for the tube. The water required for the forming process is admitted into space 15 from bore 13 in the lower electrode 5 through the connecting opening 14. Since space 15 is sealed by sealing rings 16 and the insert 17, a sufficiently high water pressure, such as is found in the water-supply system, causes the insulating component 7 with the moveable electrode portion 9 to rise. When electrode portion 9 acts against the edge 18 of the electrode portion 19 affixed to the matrix 2, the matrix halves 2 can be closed. The electrode portion 19 can also consist of two parts.

FIG. 2 shows the moveable electrode portion 9 and the firing device 8 ready for operation. The tube 1 is filled with water in the region which is to be formed. A ring-shaped copper insert 20 ensures a good electrical conductance between the electrode portion 9 and the parts of the electrode portion 19 that are compressed. Electrode portion 19 is connected with the high-voltage terminal of the capacitor bank 23 via a flexible connection 21 such as a mesh of copper wires and via a switch 22. Shown in FIGS. 1 and 2 are the capacitor bank 23 and the switch 22 which can be, for example, a three-electrode spark gap. The energizing circuit for the capacitor bank and an ignition electrode for energizing the three-electrode spark gap 22 are disclosed in copending application Ser. No. 803,179 filed on Feb. 28, 1969 and having the title: "Hydroelectric Forming Of Cylindrical Workpiece By Capacitor Discharge." The terminal of the capacitor bank 23 which carries ground potential is connected with the bottom plate 10 and thereby also with electrode 5.

Figure 3:
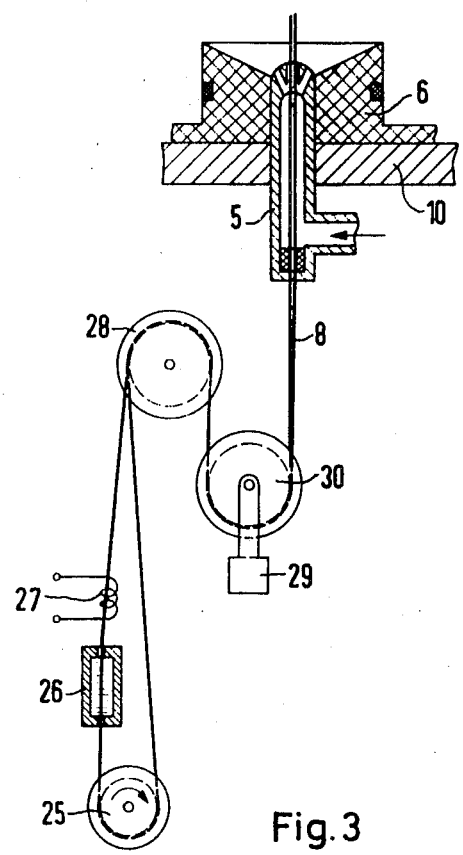
FIG. 3 is a schematic diagram illustrating how the firing device of the apparatus of the invention is controlled for renewing the jacket by using a nonconductive carrier provided with a conductive jacket.

FIG. 3 illustrates how an ignitor or firing device can be guided outside of the spark gap, for the purpose of renewing the jacket, by using a nonconductive carrier provided with a conductive jacket. As shown in FIGS. 1 and 2, the renewal of the jacket is facilitated with a double-control for the firing device by means of a barlike member around which is looped the ignitor for changing its direction, the barlike member being arranged in the electrode portion 9. Referring again to FIG. 3, the firing device comprises a continuous wire closed onto itself. The wire passes over a transport pulley 25; then through a bath of the wrapping substance 26; and through a drying installation 27 depicted by a heating spiral.

To speed up the return of insulating part 7 to its original position after the discharge the original position being illustrated in FIG. 1, the course of the firing device is also provided with a stationary direction changing pulley 28 and a translating pulley 30 which is ballasted by a weight 29. In lieu thereof, the pulley 30 can be loaded with a spring. The weight or the spring force must be selected according to the pressure of the available water. Reference numeral 5 designates the lower electrode which is surrounded by insulating portion 6 and secured to the bottom plate 10.

To those skilled in the art it will be obvious upon a study of this disclosure that my invention permits of various modifications and may be given embodiments other than particularly illustrated herein, without departing from the essential features of the invention and within the scope of the claims annexed hereto.

I claim:

1. A device for forming a workpiece by pressure waves generated in a liquid due to an undersurface spark discharge, comprising a pair of electrodes connectable in a spark discharge circuit, one of said electrodes being stationary and the other of said electrodes having a stationary part and a moveable part spaced from said stationary part and located adjacent said one electrode, said moveable part being displaceable in direction away from said one electrode and into contact with said stationary part so as to define a spark gap between said one electrode and said moveable electrode part, an ignitor connected to the moveable part of said other electrode and being moveably insertable thereby into the device so that said ignitor extends across the entire length of said spark gap when said moveable part comes into contact with said stationary part, and means for holding a workpiece in a position surrounding said ignitor and said spark gap.

2. In a device according to claim 1, said ignitor being a thread-like member, said moveable part of said other electrode having a barlike member around which said ignitor is looped for changing its direction.

3. In a device according to claim 2, said ignitor being an electrically nonconductive thread closed onto itself, said thread being coated with a jacket of electrically conductive material.

4. A device according to claim 3, further comprising a bath containing said electrically conductive material and being disposed outside of said spark gap, a first pulley rotatable at a fixed position and a second pulley rotatable about an axis translatable in dependence upon the movement of said moveable part of said other electrode, said thread being guided by said pulleys so as to be directed through said bath for applying said electrically conductive material to said thread, said second pulley being ballasted by a weight to maintain said thread in a tensed condition, and drying means disposed in the vicinity of said thread to dry the electrically conductive material applied to said thread.

5. A device for forming a tubular workpiece by pressure waves generated in a liquid, comprising a pair of electrodes connectable in a spark discharge circuit, one of said electrodes being stationary and the other of said electrodes having a stationary part and a moveable part spaced from said stationary part and located adjacent said one electrode, said moveable part being displaceable axially in the interior of the workpiece in direction away from said one electrode and into contact with said stationary part, an ignitor comprising a thread having a coating of electrically conductive material, liquid supply means for admitting the liquid into the workpiece, whereby, at the beginning of the work cycle, the pressure action of the liquid moves said movable part until it comes into mechanical and electrical contact with said stationary part to define a spark gap between said one electrode and said moveable electrode part, said moveable part including a member for looping of said thread thereover so that said thread extends in two lengths across the spark gap, said one electrode including means for passing said thread into said spark gap, and means for holding the workpiece in a position surrounding said ignitor and said spark gap.

* * * * *